UNITED STATES PATENT OFFICE.

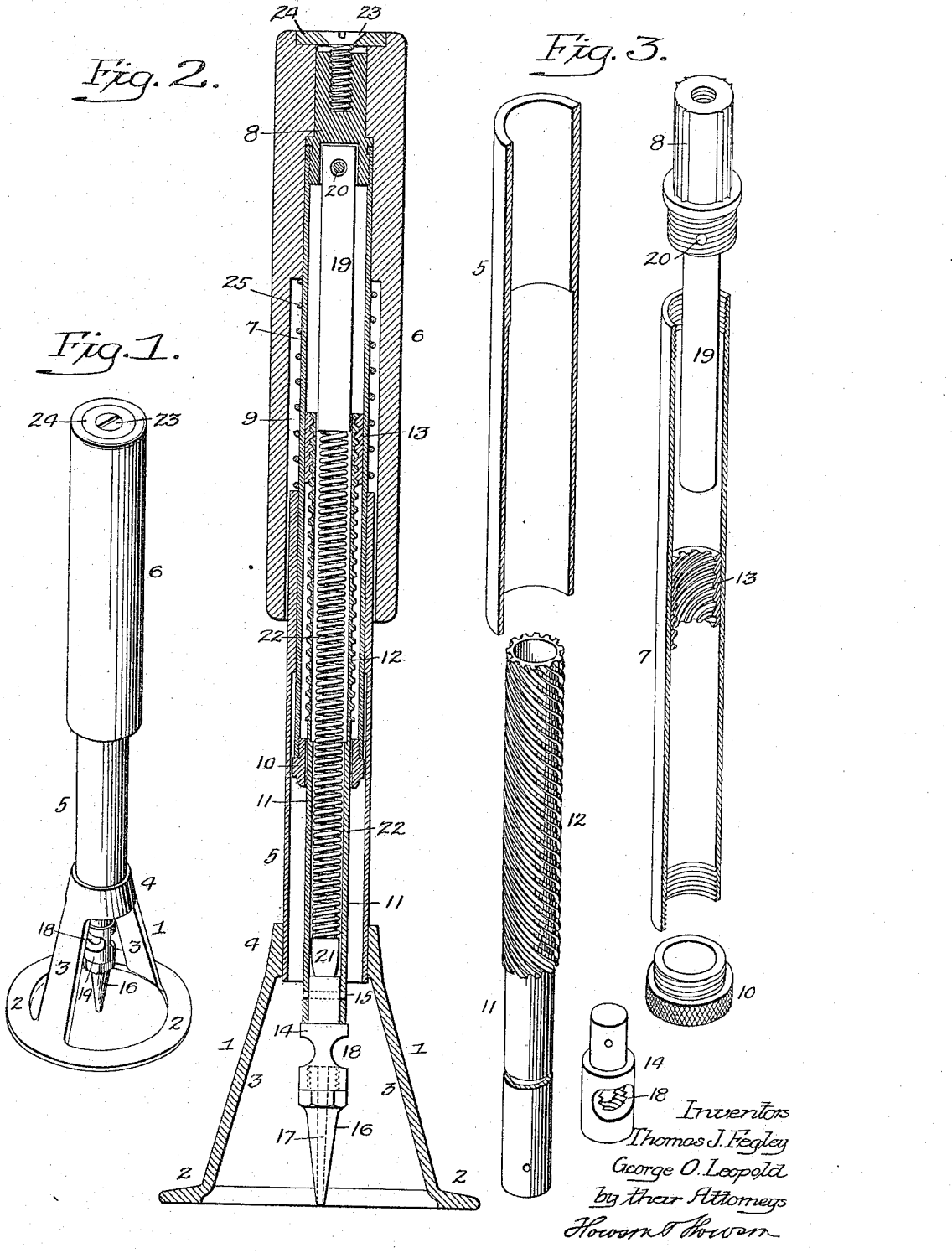

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA.

PATTERN-CUTTER.

1,209,571.      Specification of Letters Patent.      Patented Dec. 19, 1916.

Application filed February 19, 1916. Serial No. 79,367.

*To all whom it may concern:*

Be it known that we, THOMAS J. FEGLEY and GEORGE O. LEOPOLD, citizens of the United States, and residents of Philadelphia, county of Philadelphia, State of Pennsylvania, have invented certain Improvements in Pattern-Cutters, of which the following is a specification.

The object of our invention is to provide a tool for cutting the perforations in paper patterns.

In the accompanying drawing:—Figure 1, is a perspective view of our improved pattern cutter; Fig. 2, is a vertical sectional view; and Fig. 3, is a detached perspective view, partly in section, illustrating the elements of the cutter.

Our invention is particularly adapted for cutting or perforating paper patterns. These patterns are placed one upon the other to any thickness desired and the cutter penetrates the several layers, so that duplicate patterns are made.

1 is a base having a ring 2 smooth on its under side and which rests upon the pattern sheet and has uprights 3 terminating in a socket 4 to which is secured the lower end of the shell 5.

6 is a handle of such shape that it can be grasped by the hand, and attached to this handle is a tube 7 which extends into the shell 5. The upper end of the tube is attached to a plug 8 which is forced into the upper portion of the handle, as shown clearly in Fig. 2, and, in the present instance, the tube 7 has an internal thread adapted to an external thread on the plug. The handle is recessed at 9 to allow it to freely pass over the shell 5, and in some instances a spring 25 may be located between the handle and the shell 5, so as to insure the return of the handle after the punch has operated.

On the lower end of the tube 7 is a ring 10 having a shank threaded into the threaded end of the tube, and this ring acts as a guide for the tubular plunger 11 which has a threaded periphery 12. The threads of this plunger engage the threads of a nut 13 secured to the interior of the tube 7 and causes the tubular plunger to turn as it is reciprocated. Attached to the lower end of the plunger is a head 14.

In the present instance, a pin 15 extends transversely through the head and the end of the plunger, and the cutting tool 16 is secured to this head. This cutting tool is made as clearly shown in Fig. 2, with a threaded shank adapted to a threaded opening in the head and has a central tube 17 communicating with an opening 18 in the head so as to allow for the escape of the small punchings cut from the pattern sheet.

Secured to the plug 8 at the upper end of the handle is a rod 19. In the present instance, a pin 20 extends across the lower end of the plug and the rod 19 is loosely hung from the pin. The lower end of the rod, when the handle is in the raised position, extends into the upper end of the plunger and, as the rod is loose, it accommodates itself to the plunger. Mounted within the plunger and between the lower end of the rod and a bearing 21 is a coiled spring 22. The bearing rests upon the inner end of the head 14.

While the plug 8 is driven into the handle, we prefer to secure it also by means of a screw 23 which passes through a washer 24 inserted in the end of the handle and extends into the threaded opening of the plug.

The operation of the cutter is as follows:— The cutter is placed on the pattern sheet and the under side of the ring being smooth it can be moved over the pattern sheet, following the lines of the pattern. By holding the tool by one hand and reciprocating the handle with the other hand the plunger is not only forced down, but it is also turned so that the end of the cutting tool 16 makes a rotating cut in the pattern sheet or sheets. As soon as the handle is released, the springs return the handle to the elevated position, the cutter is moved and the operation repeated.

By this device a large number of sheets can be cut simultaneously and the cutting is accurate, as the base rests firmly on the pile of sheets and is held by one hand while the cutter is actuated by the other hand.

While we have shown a certain type of handle, it will be understood that a handle of any form desired may be secured to the tube 7, without departing from the main features of the invention.

We have shown a complete ring as forming the base and this form is preferred, but the base may be made up of two or more segments, if found desirable.

We claim:—

1. The combination in a pattern cutter, of a base having an extended bearing surface and open at the center; a threaded plunger having a cutting tool extending into the open center of the base; a handle; a nut thereon adapted to the threaded plunger; a spring for returning the handle; and a spring for returning the cutter after a cut has been made.

2. The combination in a pattern cutter, of a base having an open ring; a shell supported by the base; a plunger carrying a cutting tool and having a screw threaded periphery; a handle mounted on the shell and having a tube secured thereto extending within the shell and having a nut, the threads of the nut meshing with the threads of the plunger; and a spring located between the handle and the plunger.

3. The combination in a pattern cutter, of a base; a tube secured thereto; a tubular plunger carrying a cutting tool located within the base and having a screw threaded periphery; a handle; a tube secured to the handle and extending between the shell and the plunger and having a nut, the threads of the nut meshing with the threads of the plunger; a rod secured to the handle and extending into the tubular plunger; and a spring located in the plunger and bearing against the rod so that, as the handle is forced down, the spring will be compressed and the plunger will be turned.

4. The combination in a pattern cutter, of a base formed of a ring and uprights; a shell secured to the base; a tubular plunger having external screw threads and located within the shell; a cutting tool secured to the end of the plunger; a handle located on the shell; a plug at the upper end of the handle; a tube located in the handle and secured to the plug and extending into the shell; a nut on the tube engaging the threads of the plunger and having a guide ring at its lower end; a rod loosely hung from the plug of the handle and extending into the upper end of the plunger; and a spring located in the plunger and bearing against the lower end of the rod so that, when the handle is pushed down, the spring will be compressed and the plunger will be turned and, when the handle is released, the spring will return it to its normal position.

5. The combination in a pattern cutter, of a base having an open center; a shell supported by the base; a plunger carrying a cutting tool and having a screw thread on its periphery; a handle extending over the shell; a tube secured to the handle and extending into the space between the shell and the plunger and having a nut thereon meshing with the threads on the periphery of the plunger; a spring located between the plunger and the handle; and a second spring located between the shell and the handle, said springs tending to raise the handle after it has been depressed to punch the pattern.

THOMAS J. FEGLEY.
GEORGE O. LEOPOLD.

Copies of this patent may be obtained for five cents each, by addressing the "Commissioner of Patents. Washington, D. C."